(12) United States Patent
Gumpoltsberger (10) Patent No.: US 7,115,060 B2
(45) Date of Patent: Oct. 3, 2006

(54) MULTISTEP REDUCTION GEAR

(75) Inventor: Gerhard Gumpoltsberger, Friedrichshafen (DE)

(73) Assignee: ZF Friedrichshafen, Friedrichshafen (DE)

( * ) Notice: Subject to any disclaimer, the term of this patent is extended or adjusted under 35 U.S.C. 154(b) by 98 days.

(21) Appl. No.: 10/499,317

(22) PCT Filed: Dec. 17, 2002

(86) PCT No.: PCT/EP02/14356

§ 371 (c)(1),
(2), (4) Date: Jun. 17, 2004

(87) PCT Pub. No.: WO03/054420

PCT Pub. Date: Jul. 3, 2003

(65) Prior Publication Data

US 2005/0020399 A1 Jan. 27, 2005

(30) Foreign Application Priority Data

Dec. 20, 2001 (DE) ............................ 101 62 885

(51) Int. Cl.
*F16H 3/62* (2006.01)
(52) U.S. Cl. .................................... 475/276
(58) Field of Classification Search ............... 475/275, 475/276
See application file for complete search history.

(56) References Cited

U.S. PATENT DOCUMENTS

| | | | |
|---|---|---|---|
| 5,106,352 A | 4/1992 | Lepelletier | |
| 6,217,474 B1* | 4/2001 | Ross et al. | 475/269 |
| 6,572,507 B1 | 6/2003 | Korkmaz et al. | |
| 6,634,980 B1* | 10/2003 | Ziemer | 475/275 |
| 6,672,987 B1* | 1/2004 | Raghavan et al. | 475/269 |
| 6,860,831 B1* | 3/2005 | Ziemer | 475/296 |

(Continued)

FOREIGN PATENT DOCUMENTS

DE 199 12 480 A1 9/2000

(Continued)

OTHER PUBLICATIONS

Tenberge, Prof. Dr. P., "E-Automat Automatikgetriebe mit Esprit", *VDI-BERICHTE*, No. 1610, Jun. 20, 2001, pp. 455-479.

*Primary Examiner*—Dirk Wright
(74) *Attorney, Agent, or Firm*—Davis & Bujold, P.L.L.C.

(57) ABSTRACT

The multi-step reduction gear comprises one drive shaft and one driven shaft, three planetary spider sets (P1, P2, P3), the first planetary spider set (P1) defining a fixed input ratio, at least six rotatable shafts (1, 2, 3, 4, 5, 6) and at least five shift elements (03, 04, 13, 16, 45) so that six forward gears and one reverse gear can be implemented, the drive shaft (1) being connected with the sun wheel of the first planetary set (P1), the spider of the first planetary set (P1) with the housing, the driven shaft (2) with the ring gear of the second planetary set (P2) and the spider of the third planetary set (P3), and the shaft (3) being permanently connected with the spider of the second planetary set (P2) and the ring gear of the third planetary set (P3). The shaft (4) is permanently connected with the sun wheel of the second planetary set (P2), the shaft (5) being permanently connected with the ring gear of the first planetary set (P1) and the shaft (6) permanently connected with the sun wheel of the third planetary set (P3). The planetary sets (P1, P2, P3) are coupled by means of shafts (0, 1, 2, 3, 4, 5, 6) and shift elements (03, 04, 13, 16, 45).

23 Claims, 5 Drawing Sheets

U.S. PATENT DOCUMENTS 6,905,435 B1 * 6/2005 Nielsen .................. 475/276

FOREIGN PATENT DOCUMENTS

| DE | 199 49 501 A1 | 4/2001 |
| EP | 0 434 525 A1 | 6/1991 |
| GB | 1 308 006 | 2/1973 |
| JP | 2000291747 A | 10/2000 |

* cited by examiner

Fig. 1

| | 03 | 04 | 13 | 16 | 45 | I | φ |
|---|---|---|---|---|---|---|---|
| 1. | ● | | | ● | | 3,842 | 1,872 |
| 2. | | ● | | ● | | 2,052 | 1,495 |
| 3. | | | | ● | ● | 1,373 | 1,373 |
| 4. | | | ● | ● | | 1,000 | 1,312 |
| 5. | | | ● | | ● | 0,762 | 1,211 |
| 6. | | ● | ● | | | 0,630 | 1,000 |
| R. | ● | | | | ● | -3,614 | |

Fig. 11

MULTISTEP REDUCTION GEAR

According to the preamble of claim 1 the invention relates to a multi-step reduction gear in planetary design, especially an automatic transmission for a motor vehicle.

According to the prior art automatic transmission, especially for motor vehicles, comprise planetary gear sets, which are shifted by means of friction and shift elements such as clutches and brakes, are usually connected with a thrust element subject to a slip action and are optionally provided with a bridge clutch such as a hydrodynamic torque converter or a fluid clutch.

Such a transmission results from EP 0 434 525 A1. Essentially it comprises one drive shaft and one driven shaft disposed in parallel, one double planetary set disposed concentrically to the driven shaft and five shaft elements in the form of three clutches and two brakes, the optional locking of which in pairs determines the different gear ratios between the drive shaft and the driven shaft.

From the Applicant's DE 199 49 507 A1 a multi-step reduction gear is further known having on the drive shaft two non-shiftable front-mounted gear sets which produce two rotational speeds on the output side and, together with the rotational speed of the drive shaft, can optionally be shifted by selective closing of the shift element used to a shiftable double planetary set acting upon the driven shaft in a manner such that to change from one gear to the next higher or lower gear that follows only one of the two precisely actuated shift elements has to be engaged or disengaged.

In addition, it has been disclosed within the scope of EP 0 434 525 A1, a multi-step reduction gear which contains one drive shaft and one driven shaft located in a housing, one planetary set concentric with the driven shaft and consisting of four elements designated from first to fourth in order of rotational speed, that is, a so-called double planetary set, and five shift elements, namely, three clutches and two brakes whose selective engagement by pairs determines different reduction ratios between drive shaft and the driven shaft, the transmission having two power paths so that six forward gears are achieved by selective engagement by pairs of the five shift elements.

This invention is based on the problem of proposing a multi-step reduction gear of the kind described above in which the construction cost is optimized and, besides the efficiency in the main drive gears, is improved in relation to towing and toothing losses.

According to the invention said problem is solved by the features of claim 1. Advantages and other advantageous developments result form the sub-claims.

The inventive multi-step reduction gear accordingly comprises, in planetary design, one drive shaft and one driven shaft located in one housing, at least three planetary spider sets, the first planetary spider set defining a fixed input ratio for the second planetary set, at least six rotatable shafts and at least five shift elements, preferably two brakes and three clutches, whose selective engagement by pairs produces different reduction ratios between the drive shaft and the driven shaft so that preferably six forward gears and one reverse gear can be implemented.

The drive shaft is directly connected with the sun gear of the first planetary set and the spider of the first planetary set is permanently connected directly with the housing. In addition, the driven shaft is connected with the ring gear of the second planetary set and the spider of the third planetary set, one additional shaft being permanently connected with the spider of the second planetary set and the ring gear of the third planetary set and one other shaft being permanently connected with the sun gear of the second planetary set. According to the invention, furthermore one other shaft is permanently connected with the ring gear of the first planetary set; one other shaft is permanently connected with the sun gear of the third planetary set. The planetary sets are coupled by means of shift elements and/or shafts.

The inventive construction produces adequate ratios and a considerable increase of the total spreading of the multi-step reduction gear, which results in increased driving comfort and significantly reduced consumption.

The inventive multi-step reduction gear is suitable for every motor vehicle, in particular for passenger cars and industrial motor vehicles such as trucks, buses, construction vehicles, rail vehicles, track-laying vehicles and the like.

The production cost is also considerably reduced due to a small number of shift elements with the inventive multi-step reduction gear, namely, preferably only three clutches and two brakes.

It is advantageously possible with the inventive multi-step reduction gear to start off with a hydrodynamic converter, an external starting clutch, or also any other adequate external starting element. It also is conceivable to make a starting off operation possible with one starting element integrated in the transmission. The inventive multi-step reduction gear further creates a good efficiency relative to the towing and toothing losses.

Besides, small torques exist in the shift elements and also in the planetary sets. Thereby the wear and tear of the multi-step reduction gear is reduced with special advantage. Because of the small torques in the shift elements and the planetary sets, the transmission can be made of smaller dimensions which results in optimizing the installation space and in reduction of cost.

The inventive transmission is, in addition, drafted so as to make an adaptability to different drive lines possible, both in power flow direction and in spatial regard.

The invention is further explained herebelow with reference to the drawings which show.

Figure 1:
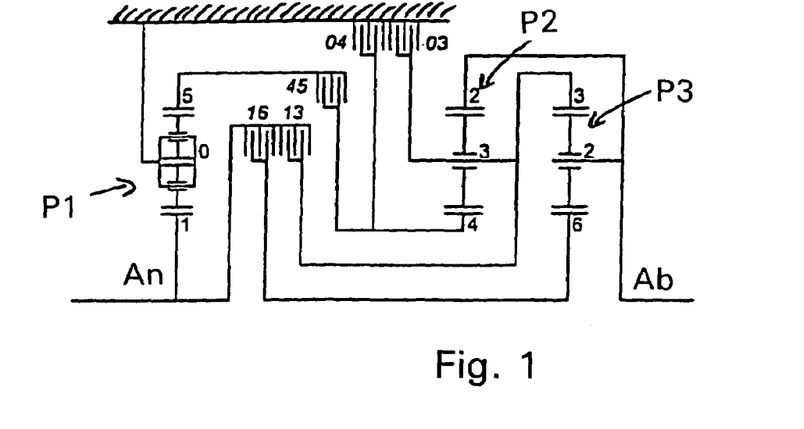
FIG. 1 is a diagrammatic view of an embodiment of an inventive multi-step reduction gear.

According to FIG. 1, the inventive multi-step reduction gear in a planetary design has one drive shaft 1 (An) and one driven shaft 2 (Ab) situated in a housing and three planetary spider sets P1, P2, P3, the first planetary spider set P1 defining a fixed input ratio for the second planetary set P2 and preferably being designed as plus planetary set. The planetary sets P2 and P3 are preferably designed as minus planetary sets. In addition, six rotatable shafts 1, 2, 3, 4, 5 and 6 are provided and five shift elements, namely, two brakes 03, 04 and three clutches 13, 16, 45, whose selective engagement by pairs produces different reduction ratios between the drive shaft and the driven shaft so that six forward gears and one reverse gear can be implemented.

As can be seen from FIG. 1, the drive shaft 1 is directly connected with the sun gear of the first planetary set P1 and the spider of the first planetary set P1 is permanently connected directly with a housing (shaft 0). The driven shaft is connected with the ring gear of the second planetary set P2 and the spider of the third planetary set P3 and the shaft 3 permanently with the spider of the second planetary set P2 and the ring gear of the third planetary set P3. The shaft 4 is also permanently connected with the sun gear of the second planetary set P2, the shaft 5 being permanently connected with the ring gear of the first planetary set P1 and the shaft 6 permanently with the sun gear of the third planetary set P3.

According to the invention, the shafts 3 and 4 can be coupled with the housing, respectively, by the brakes 03 and 04; the clutch 13 detachably connects the shafts 1 and 3 and the clutch 16 detachably connects the shafts 1 and 6, the clutch 45 detachably connecting the shafts 4 and 5.

Figure 2:
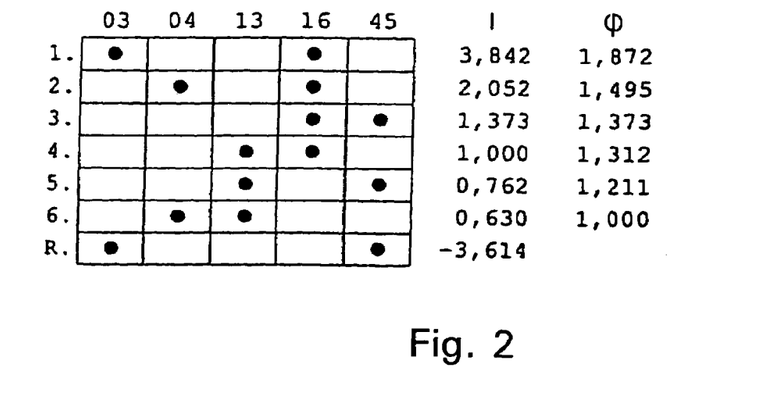
FIG. 2 is a wiring diagram of the inventive multi-step reduction gear according to FIG. 1.

The circuit diagram, corresponding to the above discussed embodiment, is the object of FIG. 2 in which are also outlined, by way of example, ratios i and the resulting gear steps Φ.

The inventive multi-step reduction gear accordingly has a progressive graduation of gears. In addition, double shifts are prevented during sequential shifting modes, since two respective adjacent gear steps use a common shift element. Furthermore, at each shift desired between the first and the fourth gear and between the fourth and the sixth gear only one respective shift element is actuated. The clutch 16 is permanently activated for the gears 1 to 4, said gears resulting by the additional activation of the brake 03 (first gear) of the brake 04 (second gear), of the clutch 45 (third gear), of the clutch 13 (fourth gear). The clutch 13 remains closed for the gears 4 to 6 and the gears result by additional activation of the clutch 45 (fifth gear) and of the brake 04 (sixth gear). According to the invention, the shifting to the reverse gear requires the activation of the brake 03 and of the clutch 45.

Figure 3:
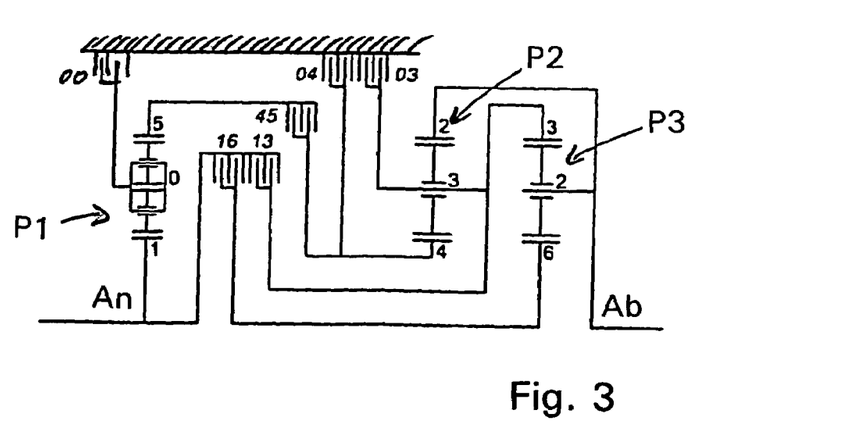
FIG. 3 is a diagrammatic view of a second embodiment of the inventive multi-step reduction gear.

For the fixed connection of the spider of the first planetary set P1 with the housing, a detachable connection such as by means of a brake can be substituted. This is shown by way of example in FIG. 3 which corresponds to the embodiment of FIG. 1 with the difference that the connection of the spider of the first planetary set P1 with the housing by means of a brake 00 is designed detachable.

Figure 4:
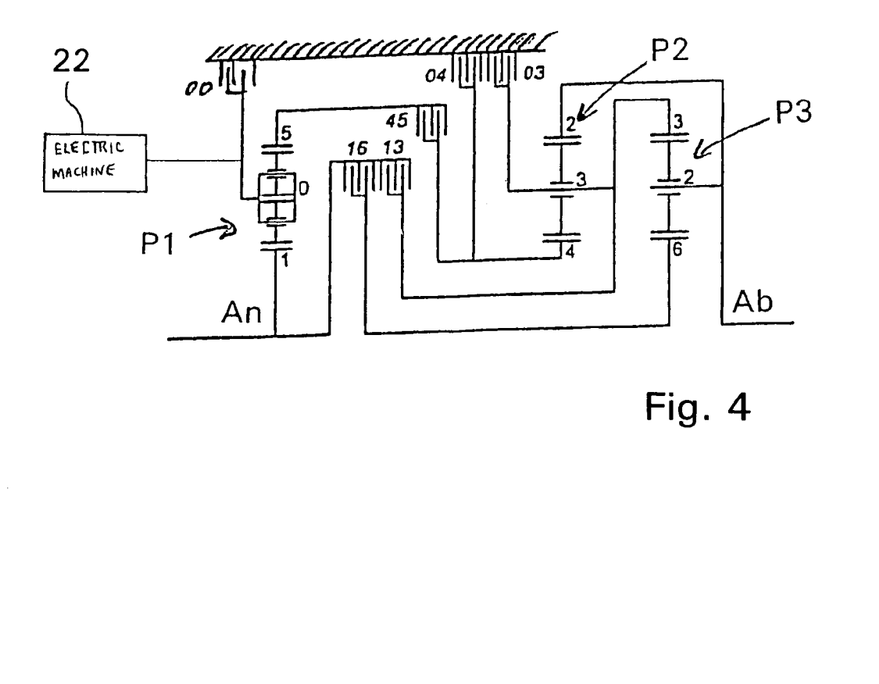
FIG. 4 is a diagrammatic view of a third embodiment of the inventive multi-step reduction gear.

As seen in FIG. 4, it is possible to situate an electric engine 22 or any other adequate additional input source upon the shaft 0 detached by means of the brake 00.

Figure 5:
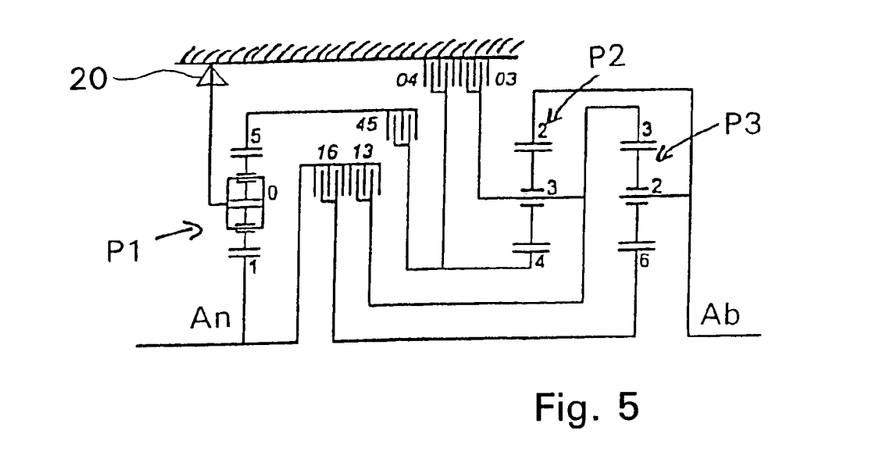
FIG. 5 is a diagrammatic view of a fourth embodiment of the inventive multi-step reduction gear.

According to the invention, seen in FIG. 5. it is possible to provide additional free wheels 20 on each adequate point of the multi-step reduction gear, for example, between one shaft and the housing or in order to separate or connect one shaft.

Figure 6:
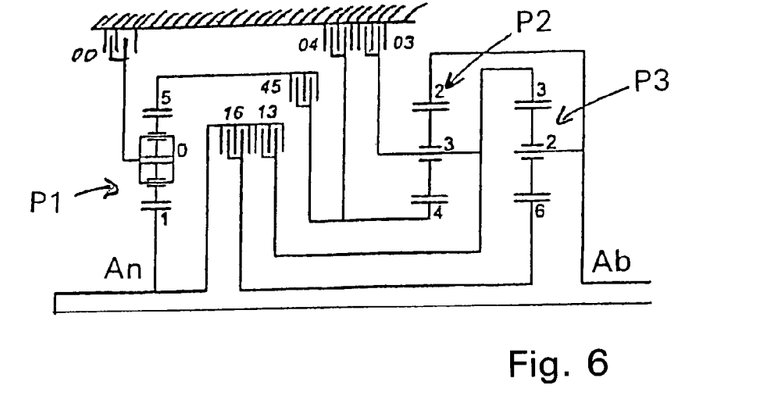
FIG. 6 is a diagrammatic view of a fifth embodiment of the inventive multi-step reduction gear.
Figure 7:
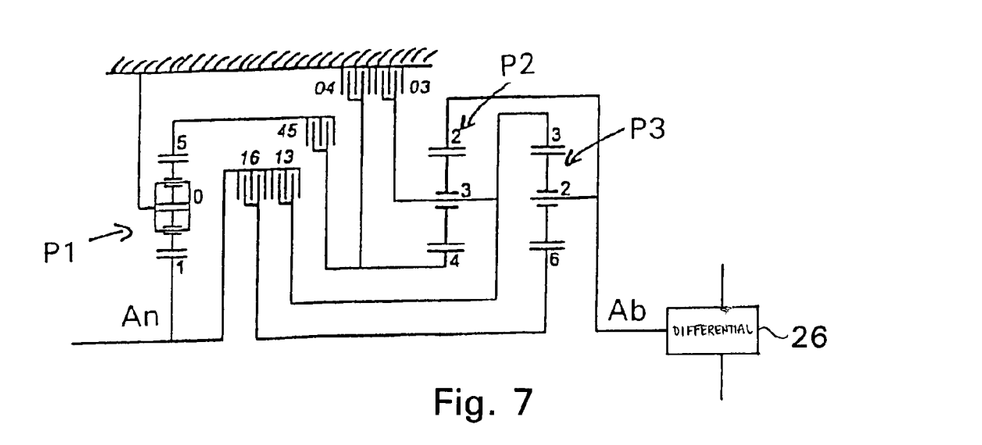
FIG. 7 is a diagrammatic view of a sixth embodiment of the inventive multi-step reduction gear.

In addition, the inventive construction makes it possible to dispose both input and output on the same side of the transmission, as seen in FIG. 6, or of the housing and also in opposition, as seen in FIG. 1, Upon the input or output side of the housing, as seen in FIG. 7, can also be located an axle differential or a distributor differential 26.

Figure 8:
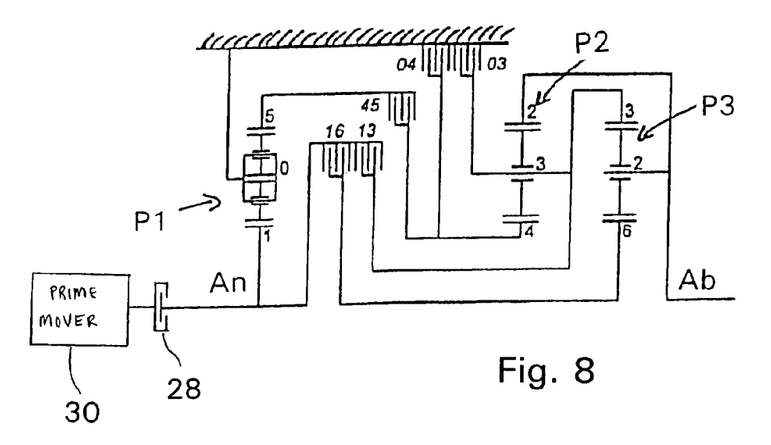
FIG. 8 is a diagrammatic view of a sevenrth embodiment of the inventive multi-step reduction gear.

Within the scope of an advantageous development, and seen in FIG. 8, the drive shaft An can be separated, as needed, from a prime mover 30 by a clutch element 28; it is possible to use a hydrodynamic converter as a clutch element, a hydraulic clutch, a dry starting clutch, a wet starting clutch, a magnetic clutch, or a centrifugal clutch.

Figure 9:
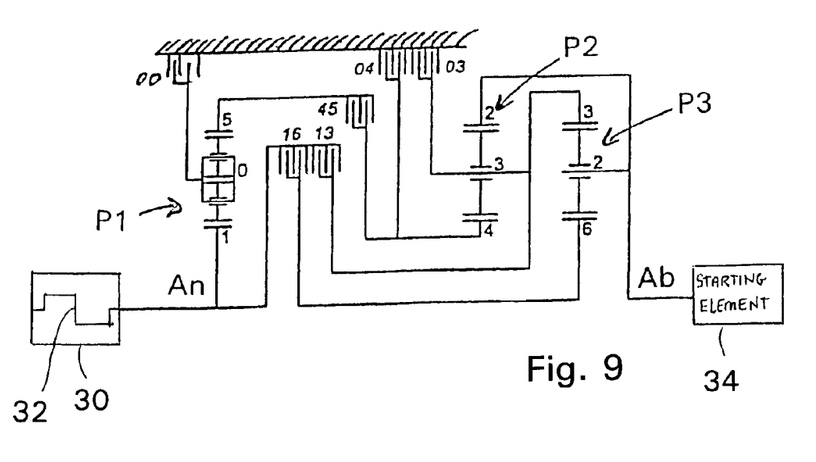
FIG. 9 is a diagrammatic view of an eighth embodiment of the inventive multi-step reduction gear.

It is also possible, as seen in FIG. 9, to situate such a starting element 34 behind the transmission, the drive shaft, in this case, fixedly connected with the crankshaft 32 of the engine (prime mover) 30. It is also possible, according to the invention, to start off by means of a shift element of the transmission, preferably by means of the brake 04, of the brake 03, or of the clutch 16.

Figure 10:
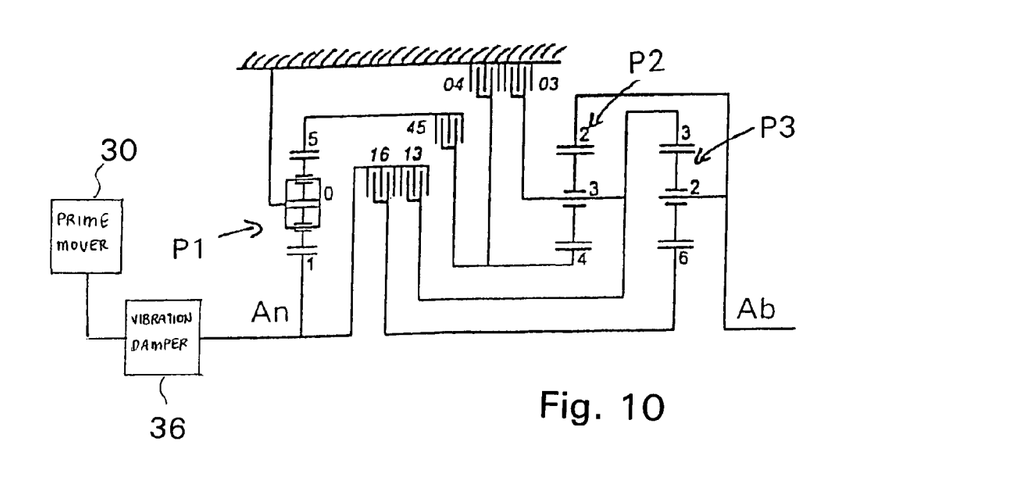
FIG. 10 is a diagrammatic view of a nineth embodiment of the inventive multi-step reduction gear.

In addition, as seen in FIG. 10, the inventive multi-step reduction gear allows situating a torsional vibration damper 36 between engine (prime mover) 30 and transmission.

Figure 11:
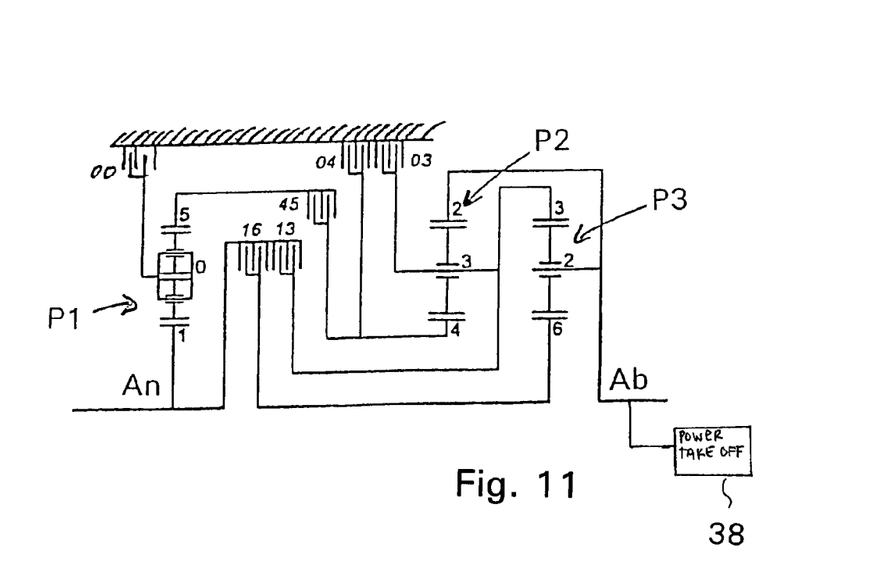
FIG. 11 is a diagrammatic view of a tenth embodiment of the inventive multi-step reduction gear.

Within the scope of one other embodiment of the invention, it is possible upon each shaft, preferably upon the drive shaft or the driven shaft, to situate a wear-free brake, this being of special importance, particularly for use in industrial vehicles. It Is also possible, as seen in FIG. 11, for the driving of additional units to provide upon each shaft one power takeoff 38.

The shift elements used can be designed as power shifted clutches or brakes; but multi-disc clutches, belt brakes and/or cone friction clutches can also be used. Positive fit brakes and/or clutches, such as a synchronizer or dog clutches, can also be used.

One other advantage of the multi-step reduction gear proposed here consists in that an electric motor can be attached to each shaft as generator and/or as additional prime mover.

| Reference numerals | |
|---|---|
| 0 shaft | 13 clutch |
| 1 shaft | 16 clutch |
| 2 shaft | 45 clutch |
| 3 shaft | P1 planetary set |
| 4 shaft | P2 planetary set |
| 5 shaft | P3 planetary set |
| 6 shaft | An input |
| 00 brake | Ab output |
| 03 brake | i ratio |
| 04 brake | φ gear step |

The invention claimed is:

1. An automatic transmission multi-step reduction gear of a planetary design for a motor vehicle, the multi-step reduction gear comprising one drive shaft and one driven shaft situated in a housing, three planetary spider sets (P1, P2, P3), a first planetary spider set (P1) defining a fixed input ratio for a second planetary set (P2), at least six rotatable shafts (0, 1, 2, 3, 4, 5, 6) and at least five shift elements (00, 03, 04, 13, 16, 45) comprising one or more of brakes and clutches and whose selective engagement in pairs produces different reduction ratios between the drive shaft and the driven shaft so that at least six forward gears and one reverse gear are implemented, wherein said drive shaft (1) is directly connected with a sun gear of said first planetary set (P1), a spider of said first planetary set (P1) is non-rotatably connected with the housing, an output is formed via a connection of the driven shaft (2) with a ring gear of the second planetary set (P2) and a spider of a third planetary set (P3), a third shaft (3) is permanently connected with a spider of the second planetary set (P2) and a ring gear of the third planetary set (P3), a fourth shaft (4) is permanently connected with a sun gear of the second planetary set (P2), a fifth shaft (5) is permanently connected with a ring gear of the first planetary set (P1) and a sixth shaft (6) is permanently connected with a sun gear of the third planetary set (P3), a first brake (03) releasably couples the third shaft (3) with the housing, the fourth shaft (4) is releasably coupled by a second brake (04) with the housing, a first clutch (13) detachably connects the drive shaft (1) with the third shaft (3), a second clutch (16) detachably connects the drive shaft (1) with the sixth shaft (6) and a third clutch (45) detachably connects the fourth shaft (4) with the fifth shaft (5).

2. The multi-step reduction gear according to claim 1, wherein the transmission has at least one free wheel.

3. The multi-step reduction gear according to claim 2, wherein the at least one free wheels is inserted between one of the six rotatable shafts (0, 1, 2, 3, 4, 5) and the housing.

4. The multi-step reduction gear according to claim 1, wherein the drive shaft and the driven shaft are located upon the same side of the housing.

5. The multi-step reduction gear according to claim 1, wherein the drive shaft and the driven shaft are located on opposite sides of the housing.

6. The multi-step reduction gear according to claim 1, wherein upon one of an input and upon an output side of the housing one of an axle and a distributor differential is located.

7. The multi-step reduction gear according to claim 1, wherein the drive shaft (1) is separated from a prime mover by a clutch element.

8. The multi-step reduction gear according to claim 7, wherein the clutch element is one of a hydrodynamic converter, a hydraulic clutch, a dry starting clutch, a wet starting clutch, a magnetic clutch and a centrifugal clutch.

9. The multi-step reduction gear according to claim 1, wherein an external starting element is situated downstream of the transmission and the drive shaft (1) is fixedly connected with a crankshaft of a prime mover.

10. The multi-step reduction gear according to claim 1, wherein a first shift element commences starting of the transmission, and a crankshaft of an engine is permanently connected with the drive shaft (1).

11. The multi-step reduction gear according to claim 10, wherein one of the second brake (04), the first brake (03) and the second clutch (16) is used as the first shift element.

12. The multi-step reduction gear according to claim 1, wherein a torsional vibration damper is located between a prime mover and the transmission.

13. The multi-step reduction gear according to claim 1, wherein a wear-free brake is situated upon at least one the six rotatable shafts (0, 1, 2, 3, 4, 5).

14. The multi-step reduction gear according to claim 13, wherein the wear-free brake is situated upon one of the drive shaft (1) and the driven shaft (2).

15. The multi-step reduction gear according to claim 1, wherein a power takeoff is situated upon at least one of the at least six rotatable shafts (0, 1, 2, 3, 4, 5) for input to an additional unit.

16. The multi-step reduction gear according to claim 15, wherein the power takeoff is situated upon at least one of the drive shaft (1) and the driven shaft (2).

17. The multi-step reduction gear according to claim 1, wherein the at least five shift elements (00, 03, 04, 13, 16, 45) are one of powershifting clutches and brakes.

18. The multi-step reduction gear according to claim 17, wherein at least one of multi-disc clutches, belt brakes and cone clutches is used.

19. The multi-step reduction gear according to claim 1, wherein the at least five shift elements (00, 03, 04, 13, 16, 45) are one of positive fit brakes and clutches are provided as shift elements.

20. The multi-step reduction gear according to claim 1, wherein upon at least one shaft an electric machine is mounted as one of a generator and an added prime mover.

21. An automatic transmission multi-step reduction gear of a planetary design for a motor vehicle, the multi-step reduction pear comprising:
one drive shaft and one driven shaft situated within a housing;
three planetary spider sets (P1, P2, P3) with a first planetary spider set (P1) defining a fixed input ratio for a second planetary set (P2);
at least six rotatable shafts (0, 1 , 2, 3, 4, 5, 6); and
at least five shift elements (00, 03, 04, 13, 16, 45) comprising one or more of brakes and clutches and whose selective engagement in pairs produces different reduction ratios between the drive shaft and the driven shaft so that at least six forward gears and one reverse gear are implemented;
wherein said drive shaft (1) is directly connected with a sun gear of said first planetary set (P1), a spider of the first planetary set (P1) is detachable connected with the housing by a third brake (00), an output is formed via a connection of the driven shaft (2) with a ring gear of the second planetary set (P2) and a spider of a third planetary set (P3), a third shaft (3) is permanently connected with a spider of the second planetary set (P2) and a ring gear of the third planetary set (P3), a fourth shaft (4) is permanently connected with a sun gear of the second planetary set (P2), a fifth shaft (5) is permanently connected with a ring gear of the first planetary set (P1) and a sixth shaft (6) is permanently connected with a sun gear of the third planetary set (P3);
a first brake (03) releasably couples the third shaft (3) with the housing, a second brake (04) releasably couples the fourth shaft (4) with the housing, a first clutch (13) detachably connects the drive shaft (1) with the third shaft (3), a second clutch (16) detachably connects the drive shaft (1) with the sixth shaft (6) and a third clutch (45) detachably connects the fourth shaft (4) with the fifth shaft (5).

22. The multi-step reduction gear according to claim 21, wherein upon a seventh shaft (0), detached from the housing, one of an electric machine and another prime mover is situated.

23. An automatic transmission multi-step reduction gear of a planetary design for a motor vehicle, the multi-step reduction gear comprising:
one drive shaft and one driven shaft situated within a housing;
three planetary spider sets (P1, P2, P3) with a first planetary spider set (P1) defining a fixed input ratio for a second planetary set (P2);
at least six rotatable shafts (0, 1, 2, 3, 4, 5, 6); and
at least five shift elements (00, 03, 04, 13, 16, 45) comprising one or more of brakes and clutches and whose selective engagement in pairs produces different reduction ratios between the drive shaft and the driven shaft so that at least six forward gears and one reverse pear are implemented;

wherein said drive shaft (1) is directly connected with a sun gear of said first planetary set (P1), a spider of said first planetary set (P1) is non-rotatably connected with the housing, an output is formed via a connection of the driven shaft (2) with a ring gear of the second planetary set (P2) and a spider of a third planetary set (P3), a third shaft (3) is permanently connected with a spider of the second planetary set (P2) and a ring gear of the third planetary set (P3), a fourth shaft (4) is permanently connected with a sun gear of the second planetary set (P2), a fifth shaft (5) is permanently connected with a ring gear of the first planetary set (P1) and a sixth shaft (6) is permanently connected with a sun gear of the third planetary set (P3), a first brake (03) releasably couples the third shaft (3) with the housing, a second brake (04) releasably couples the fourth shaft (4) with the housing, a first clutch (13) detachably connects the drive shaft (1) with the third shaft (3), a second clutch (16) detachably connects the drive shaft (1) with the sixth shaft (6) and a third clutch (45) detachably connects the fourth shaft (4) with the fifth shaft (5); and the first planetary set (P1) is a plus planetary set and the secondary planetary set (P2) and the third planetary set (P3) are minus planetary sets.

* * * * *